UNITED STATES PATENT OFFICE.

JOHANN K. KESSLER, OF MILWAUKEE, WISCONSIN, ASSIGNOR OF ONE-HALF TO FRANK SILLER, OF SAME PLACE.

PRODUCTION OF GLYCERINE FROM THE MOTHER-LIQUOR OF SOAP-FACTORIES.

SPECIFICATION forming part of Letters Patent No. 277,575, dated May 15, 1883.

Application filed February 15, 1883. (No specimens.)

*To all whom it may concern:*

Be it known that I, JOHANN KARL KESSLER, a subject of the Emperor of Germany, but now residing in the city of Milwaukee, in the county of Milwaukee, in the State of Wisconsin, have invented certain new and useful Processes for the Production of Glycerine from the Mother-Liquor of Soap-Factories; and I do hereby declare that the following is a full, clear, and exact description of the invention, which will enable others skilled in the art to which it appertains to make and use the same.

It is well known that in the manufacture of soap fats and oils are boiled with caustic soda and water until the entire mixture forms one transparent homogeneous mass called "soap-glue." When this moment has arrived a certain quantity of common salt is added, then the soap separates, since it is insoluble in a concentrated solution of common salt. The soap is thus separated from the water, which latter now holds in solution the salt, and also contains the entire quantity of glycerine, which glycerine had before been a component part of the fats and oils. This salt solution containing glycerine is the "mother-liquor" hereinabove mentioned, and well known by that name. The separation and production of glycerine from this mother-liquor has thus far never been profitably accomplished, because no method by which it could be so done has been known.

I now proceed to describe a process by which I have succeeded in manufacturing good glycerine from such mother-liquor. The method is based upon the use of suboxide of copper, and upon certain chemical reactions, which I first proceed to set out:

First, suboxide of copper forms, somewhat like silver, in connection with muriatic acid, a union, the product of which is insoluble in water, in glycerine, and in diluted sulphuric acid—that is to say, the product subchloride of copper. Witness the formula: $Cu_2O + HCl = Cu_2Cl + HO$.

Second, if articles containing chlorine—such as common salt (chloride of sodium)—dissolved in water be mixed with sufficient sulphuric acid and then with suboxide of copper, subchloride of copper is formed, which separates as an insoluble powder, while the chloride of sodium is converted into sulphate of sodium, (Glauber's salt.) Witness the formula: $NaCl + SO_3 + XHO + Cu_2O = NaOSO_3 + 10HO + Cu_2Cl$. If glycerine containing common salt, instead of water containing common salt, be subjected to the same treatment with sulphuric acid and suboxide of copper, the same process takes place, and the result is, on the one side, the insoluble subchloride of copper, and on the other side glycerine containing, instead of common salt, Glauber's salt.

Third, this subchloride of copper can always be changed back into suboxide of copper by means of lime or caustic soda. It can therefore be repeatedly used for the above-described process. Witness the formula: $Cu_2Cl + CaO = Cu_2O + CaCl$.

It is well known that glycerine impure by containing common salt cannot be freed from this impurity either by evaporation or crystallization, nor can any such impure glycerine be distilled. These are the impediments which have heretofore prevented the profitable manufacture of glycerine from the mother-liquor of soap-factories; but if the common salt contained in such glycerine be converted, as above described, into Glauber's salt, and at the same time the chlorine be extracted by the use of suboxide of copper, as above set out, then the Glauber's salt can easily be crystallized out; but even if a portion of Glauber's salt were to remain in the glycerine, this fact would be of no consequence, as its presence would in no way be an obstruction to distillation. Distillation can now be proceeded with without such interruptions as running over or foaming, and the distilled article will be entirely free from even the least trace of chlorine.

It remains yet for me to describe the separate operations of the process: The mother-liquor has to be neutralized with sulphuric or muriatic acid and then concentrated by evaporation in iron or lead pans. During evaporation a large quantity of common salt separates, which is taken out of the pans, and the adhering liquid removed from it by centrifugal power. Evaporation is continued until the liquid has the consistency of a thin sirup, which, after cooling, can be freed from the sediment of salt also by centrifugal power. After ascertaining, by analysis, how much common salt is still contained in the cooled liquid, sufficient diluted sulphuric acid (one part $SO_3HO$ and two parts water) has to be mixed with it, not only to convert all the common salt into Glauber's salt, but also to leave an excess of sulphuric acid in the mixture. This excess is needed in order to give full assurance that all the salt has been properly transformed. The best proportions are for each one part common salt two parts sulphuric acid. Immediately after the sulphuric acid has been thoroughly mixed with this crude glycerine a thin mush of suboxide of copper has to be added until a filtered sample of the mixture proves free of chlorine. This can easily be ascertained by the use of silver solution. When this point has been reached the subcloride of copper is allowed to settle and is separated from the glycerine solution, the latter is neutralized with carbonate of soda and again concentrated by evaporation until a salt crust begins to form on its surface. Upon the liquid becoming cold considerable Glauber's salt will have formed in large crystals, from which the liquid can be separated by centrifugal power. A still-continued concentration by evaporation will cause the remaining Glauber's salt to settle as water-free salt, and when the glycerine solution shows a consistency of 28° Baumé it has to be at once transferred to the still and distilled in the customary way by means of superheated steam.

The subchloride of copper formed in above-described process must be mixed with water heated to boiling, and sufficient lime-water added to let the mixture just show alkali reaction. After heating again to boiling-heat, the mixture is left to settle. The sediment will be suboxide of copper, which, after being washed, can again be used.

The above-described process can be shortened and the production of Glauber's salt avoided by the following process: The operations proceed as just described to the time that the glycerine has been freed from common salt as much as possible by evaporation. The cooled sirup-like glycerine solution is then mixed with concentrated muriatic acid. Since common salt is insoluble in muriatic acid, it separates. The glycerine solution is then separated from the salt by centrifugal power, and is now a liquid containing no salt, but containing a quantity of muriatic acid. To this liquid must be added suboxide of copper, which unites with the muriatic acid and settles as insoluble subchloride of copper. The liquid separated from this subchloride of copper becomes a glycerine solution entirely free from salt and chlorine. It must now be concentrated by evaporation to 28° Baumé and then distilled.

The points I claim as new in the above-described processes, and for which I ask the issuance of Letters Patent, are these:

1. The use of suboxide of copper for the purpose of separating and extracting the chlorine from mother-liquor condensed till it becomes crude glycerine or from crude glycerine otherwise obtained, as described.

2. The use of suboxide of copper in connection with sulphuric acid for the extraction of chlorine and simultaneously for the conversion into Glauber's salt of the common salt contained in mother-liquor condensed till it becomes crude glycerine or in crude glycerine otherwise obtained, as described.

3. The use of suboxide of copper for the purpose of separating the muriatic acid where that acid has been used for the separation of salt from crude glycerine, as described substantially above.

JOHANN KARL KESSLER.

Witnesses:
JOHN BEHLING,
NETTIE H. VAN HORN.